Feb. 4, 1930.  A. O. MICKELSON  1,745,631
METHOD OF PRODUCING ROOFING ELEMENTS AND PRODUCT THEREOF
Original Filed Dec. 4, 1926    4 Sheets-Sheet 1
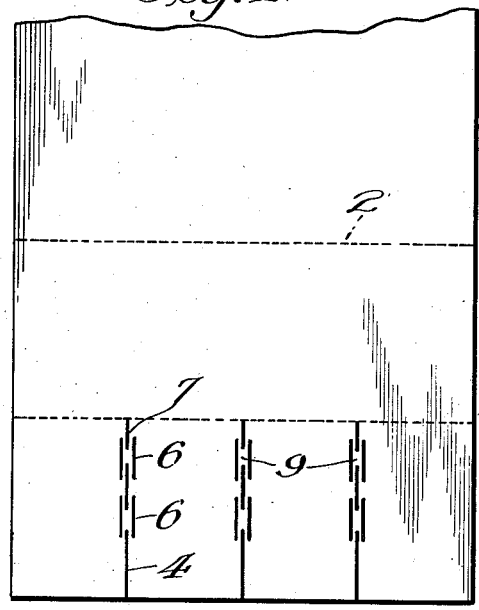
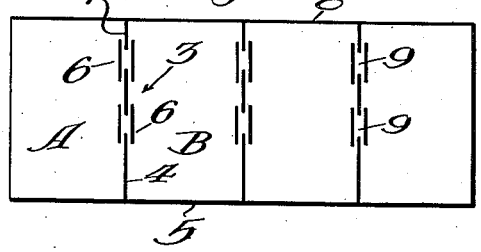
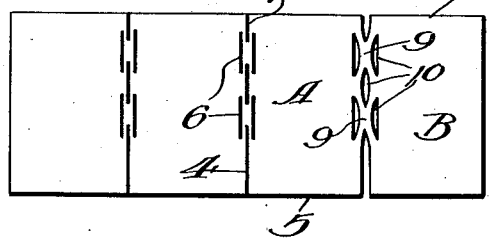
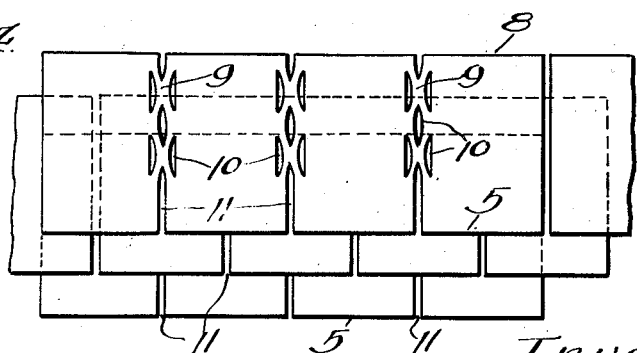
Inventor
Alfred O. Mickelson,
by Frank L. Belknap
Atty Feb. 4, 1930. A. O. MICKELSON 1,745,631
METHOD OF PRODUCING ROOFING ELEMENTS AND PRODUCT THEREOF
Original Filed Dec. 4, 1926  4 Sheets-Sheet 2
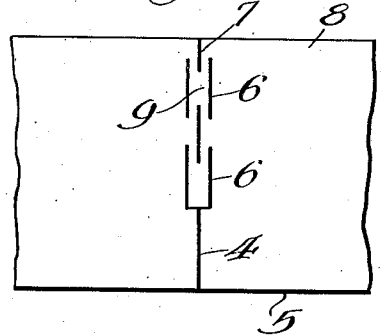
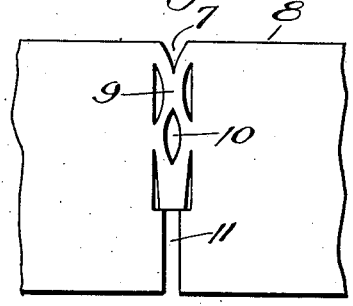
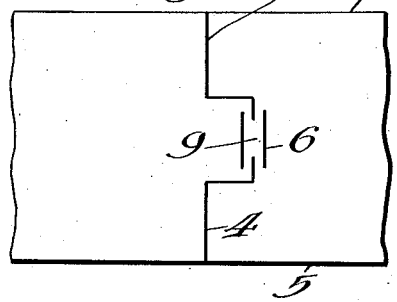
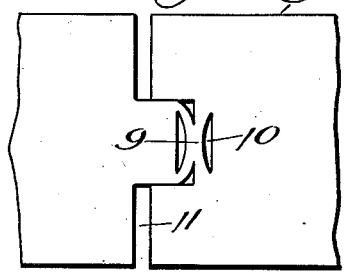
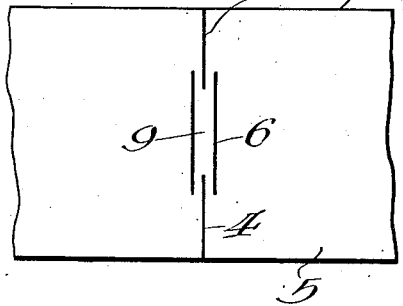
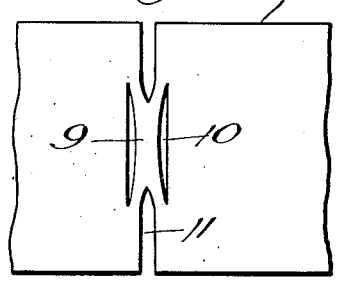
Inventor
Alfred O. Mickelson.
by Frank L. Belknap
Atty

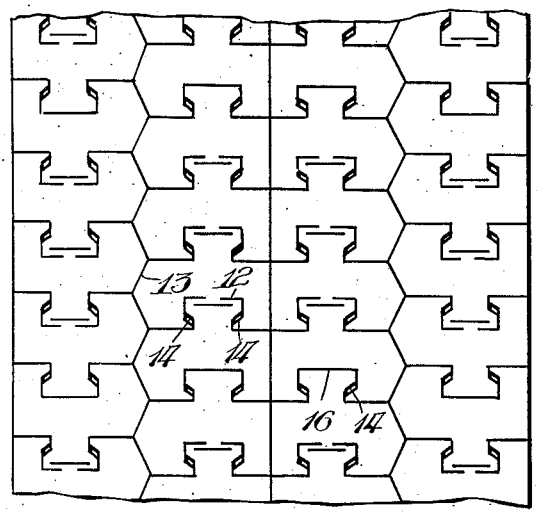

Patented Feb. 4, 1930

1,745,631

UNITED STATES PATENT OFFICE

ALFRED O. MICKELSON, OF CHICAGO, ILLINOIS, ASSIGNOR, BY DIRECT AND MESNE ASSIGNMENTS, OF ONE-HALF TO HARRY A. CUMFER, OF CHICAGO, ILLINOIS, AND ONE-HALF TO WILLARD J. MASON, OF GREENWICH, CONNECTICUT

METHOD OF PRODUCING ROOFING ELEMENTS AND PRODUCT THEREOF

Application filed December 4, 1926, Serial No. 152,569. Renewed June 19, 1929.

The present improvements relate more particularly to a method of producing flexible roofing elements whereby a builtup roof utilizing the shingle elements produced by the method of the present invention simulates in appearance, the tab-cut shingle elements of the present day, and has many advantages thereover.

In a more specific embodiment of the present invention, the method comprises first producing spaced broken lines of incision in a sheet of flexible roofing material in pre-arranged design so that when individual roofing elements are severed from said sheet, at least one of said spaced lines of incision will open to an edge while other lines of incision will lie wholly between the edges, and then, in laying said individual roofing element with others in overlapping relation on a roof, a portion of the body to one side of a set of incisions is secured in place, and pressure or tension applied to an adjacent portion of the body on the opposite side of said set of incisions to expand or spread the material apart at said incisions to produce apertures, the non-slitted portions functioning as connecting hinges. This latter portion of the body is then secured in spread or expended position and the operation repeated with an adjacent portion and set of incisions whereby a builtup roof results.

The invention applies broadly to indivdual shingles, shingle strips, strip roofing or slabs and the roofing element may conform in design to any of the conventional designs, the exposed edge of which may take any form, for instance of a rectangle, diamond, semi-hexagonal or the like.

One of the objects of the present invention is to simulate in a built-up roof the tab-cut shingle elements of the present day, in which the tabs are sometimes cut out and sometimes thrown away, by providing a novel method of slitting and spreading to produce the same result without any waste of tab cut portions.

Another object is to permit spreading or expanding of the individual elements so that a substantially greater surface area is covered, using less material than when using the tab-cut element of the prior art; said increase in area covered being directly correlated to the amount of spreading and expansion.

One of the important advantages of the present invention resides in economy in the saving of material forming the tabs, which, under present practice, is sometimes thrown away, resulting in very appreciable loss. Another advantage resides in the increased area covered.

Many other objects and advantages will be more apparent from the following description.

In the drawings, Fig. 1 is a fragmentary plan view illustrating a sheet of flexible roofing material in which sets of spaced incisions are produced longitudinally of the sheet.

Fig. 2 is a plan view of a single strip transversely severed from the sheet shown in Fig. 1.

Fig. 3 is a view similar to Fig. 2 illustrating the spreading or expanding of adjacent portions of the body of the strip.

Fig. 4 is a fragmentary plan view of a built-up roof embodying the present invention.

Figs. 5, 7, 9, 11 and 13 are fragmentary plan views illustrating different arrangements of spacing the lines of incision relative each other and also illustrating strips having different designs on their lower edges.

Figs. 6, 8, 10, 12 and 14 are views similar thereto illustrating the appearance of the element after spreading or expanding.

Fig. 15 is a fragmentary plan view illustrating a sheet of flexible roofing material in which sets of spaced incisions are provided transversely of the sheet.

Fig. 16 is a plan view of a single strip longitudinally cut from the sheet shown in Fig. 15.

Fig. 17 is a similar view illustrating said strip as expanded.

Fig. 18 is a plan view a built-up roof utilizing the design illustrated in Figs. 15, 16 and 17.

Figure 11:
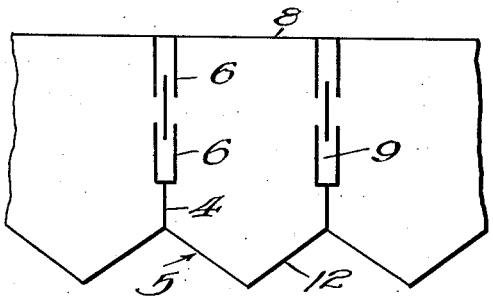

Referring more in detail to the drawings, 1 designates as a whole a strip of flexible roofing material which may comprise felt or other suitable material saturated and impregnated if desired, with a water-proofing material such as asphalt, and if desired, provided with a surfacing of granular material. The strip of material designated by numeral 1 may comprise a sheet between say 32 and 40 inches wide more or less, as may be found most suitable for the purposes of the present invention. The numeral 2 designates a transverse line of severance whereby invididual roofing strips such as shown in Fig. 2 are cut from the sheet 1.

Referring more particularly to Fig. 2, sets of spaced broken severing lines or slits designated as a whole 3, may be produced in the sheet at least one of said lines designated 4 opening to the lower edge 5 of the element. In order to carry out the purpose of the present invention, it is preferable in the design illustrated in Figs. 1 and 2 to provide, in addition to a line similar to line 4, a pair of spaced lines of severance 6 extending on both sides of the line 4. The purpose of this arrangement is to permit of spreading between adjacent body portions designated diagrammatically by the letters A and B. A short broken line of incision 7 may open to the top edge 8 of the strip. It is to be understood clearly that I do not in any way wish to limit myself to any particular arrangement of lines of incisions except that it is preferable that at least one of the lines of each set open to the lower edge of the element, and it is also preferable that the end of one line project into a plane beyond the end of an adjacent line for the purpose of producing hinges or connecting portions designated as a whole 9.

It is also to be understood that I do not in any way wish to limit myself to the particular style or design of shingle element, nor do I wish to limit myself in any way to the particular design which may be formed on the lower edge.

In laying the shingle element on the roof, a nail or other fastening element is driven through the portion A so that this portion is fixedly secured in place on the roof. Pressure or tension is then imposed, for instance, by means of the hand on the portion B of the body on the opposite side of the incision 3, causing the incision 3 to spread and expand to produce apertures illustrated diagrammatically at 10 (Fig. 3) with intervening connecting portions 9. A second fastening element is then driven through the portion B while it is in spread or expanded position. Regardless of the type of shingle used, the same operation is carried out as will be obvious to those skilled in the art, and a built-up roof comprising overlying and underlying courses of shinge elements made in accordance with the present invention will assume the appearance illustrated in Fig. 4, in which the exposed lower edges 5 only exhibit the spaces or apertures 11, the other apertures 10 being concealed by an overlying element. A built-up roof utilizing roofing elements manufactured in accordance with the present invention will simulate in appearance tab-cut elements of the present day in which the tabs are cut out and thrown away. It has been ascertained that this loss of material comprising the tabs sometimes cut out and sometimes thrown away, amounts to between 2½ and 3%, which based on the total volume of business in the flexible roofing art, is appreciable. The great advantage and utility of the present invention will therefore be most obvious to those interested in this saving of material, without in any way sacrificing strength or attractiveness of appearance, said build-up roof as illustrated in Fig. 4, simulating exactly a built-up roof constructed of tab-cut roofing elements. The cost of producing the incisions 3 is negligible, and in any event, would not be greater than the cost of acting on a sheet to cut and remove the tabs to produce the same effect.

The time required for laying a complete roof utilizing the present invention would not be materially greater than the time required for laying a roof utilizing tab-cut roofing elements.

Figure 12:
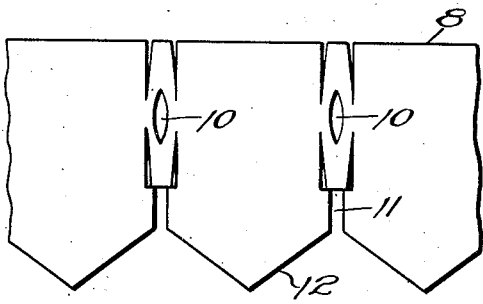
Figure 13:
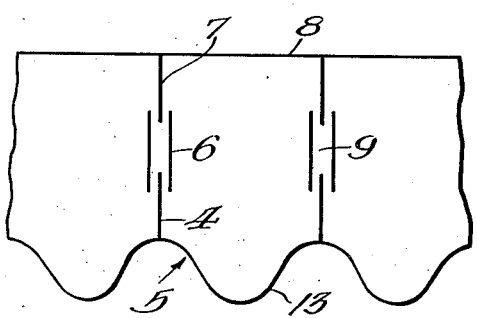
Figure 14:
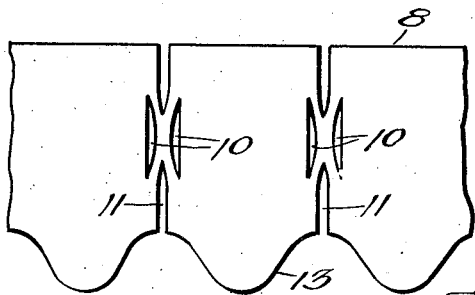

Figs. 5 to 10 both inclusive, illustrate different arrangements of lines of incisions to produce the same effect. It is to be noted however, in Figs. 5 to 10 and also in Figs. 11 to 14, that a main line 4 opens to the lower edge 5 of each element and that a pair of parallel lines 6 as well as lines 7 are provided, leaving the connecting elements 9 between lines 6, thus when the sheet is spread, apertures 10 and 11 are produced.

Referring more particularly to Figs. 11 to 14, these figures illustrate a form of roofing element in which the lower edge respectively, takes the form of a semi-diamond 12 and a scalloped edge 13. Figs. 11 to 14 are merely illustrative of types of designs which might be incorporated in the lower edges within the contemplation of the present invention.

In addition to the advantages accruing from the saving of material forming the tabs as above set forth, it will be instantly apparent that a larger area of a roof can be covered with a lesser quantity of material than is now possible. This increase in area covered, is directly related to the amount of material saved in ratio to the increase in final width of each element when fixed in spread position over the width before spreading, which increase may comprise as high as 15%, more or less. It may be pointed out that this increase in area covered is produced without sacrificing strength or attractiveness.

In Fig. 15, I have illustrated a method of making incisions in a larger sheet of roofing material transversely of said sheet, the individual strips being severed on longitudinal lines. In this figure, I have also illustrated a different shape or type of shingle strip, which, of course, falls within the purview of the present invention. The numeral 12 will illustrate the transverse lines of incision and the numeral 13 will illustrate the longitudinal severing lines.

As a feature of the illustrations shown in Figs. 15 to 18, spaced recesses 14 are produced in said sheet, the material being cut out and removed to form said recesses. These recesses may be of any shape, design or size, and it is to be understood that I do not in any way wish to limit myself to recesses of the size or shape illustrated at 14. The purpose of providing recesses is to permit of self-spacing and accurate alignment of each strip relative to adjacent strips, and of adjacent body portions of the same strip. A comparison between Figs. 16 and 17 will instantly illustrate this point. As the sheet is expanded, the inner edges defined by the recess will move toward the opposite edges defined by the recess, and when these two edges contact, as illustrated at 15 in Fig. 17 further expansion is prevented and the spaces 11 will all be of uniform width. This uniform width of the spaces 11 is, of course, based on the assumption that the size of the recesses 14 is uniform throughout.

As another feature, each strip cut out from the larger sheet illustrated in Fig. 15 has a projection portion 16 on one end and a recess 17 on the opposite end corresponding substantially in shape and size, so that as the strips are laid in overlapping courses on a roof and adjacent each other transversely across the roof, the projections 16 will fit into the recesses 17 to form a locking connection therebetween and providing a butt barrier against the action of rain, wind or snow blowing upwardly underneath the strips. The importance of the latter advantage will be immediately realized by those skilled in the art. In forming the projections 16 and corresponding cutouts 17 illustrated in Fig. 15, the recesses 14 are formed, as indicated, thus permitting the same amount of expansion in the interlocking connection at C, (Fig. 18) as permitted in the adjacent portions of the strip which are progressively expanded.

It is to be understood that the designs illustrated in Figs. 16 to 18 are merely illustrative and that any designs may be utilized involving the same principle. It is also to be understood that certain strips may be more advantageously cut longitudinally of a large sheet of roofing material than transversely and obviously certain types may be more advantageously cut transversely than longitudinally. I do not, of course, wish to be limited to cutting either transversely or longitudinally with any particular design, as the most advantageous way of cutting will be obvious to those skilled in the art.

I claim as my invention:

1. A method which comprises acting on flexible roofing material to produce spaced lines of incision therein, at least one of said lines opening to an edge, in securing to a roof the body portion of said roofing material on one side of said incisions, in exerting pressure or tension on the body portion on the opposite side of said incisions to spread the material apart and produce apertures on said incisions between said opposite portions, in then fixedly securing the latter body portion in said spread position.

2. A method which comprises acting on flexible roofing material to produce spaced lines of incision therein, at least one of said lines opening to an edge, in securing to a roof the body portion of said roofing material on one side of said incisions, in exerting pressure or tension on the body portion on the opposite side of said incisions to spread the material apart and produce apertures on said incisions between said opposite portions, and in then fixedly securing the latter body portion in said spread position, and building up a roof by laying said elements in overlapping courses to conceal all of said apertures except those opening to the lower edges whereby to simulate a built-up roof of tab-cut shingles.

3. A method which comprises acting on flexible roofing material to produce spaced lines of incision therein, at least one of said lines opening to an edge, in applying said material to a roof and fixedly securing a portion of the body thereof on one side of said incisions in place, in then exerting pressure or tension on another portion of the body on the opposite side of said incisions to cause spreading and produce apertures along the lines of said incisions, and in then fixedly securing said latter portion in spread position.

4. A flexible roofing element comprising a body portion defined by sides, said body portion being provided with spaced broken lines of incisions opening to an edge, the unsevered connecting portions between adjacent incisions being of sufficient width to prevent complete separation of the portion of the body on one side from the portion of the body on the other side of said lines of incisions.

5. A method which comprises acting on flexible roofing material to produce spaced lines of incision therein, in securing to a support the body portion of said roofing material on one side of said incisions, in exerting pressure or tension on the body portion on the opposite side of said incisions to spread the material apart and produce apertures on said incisions between said opposite portions, and in then fixedly securing the latter body portion in said spread position.

6. A method which comprises acting on flexible roofing material to produce separated sets of spaced lines of incision therein, in securing to a support the body portion of said roofing material on one side of a set of said incisions, in exerting pressure or tension on the body portion on the opposite side of said set of incisions to spread the material apart and produce apertures along the lines of said incisions between said opposite portions, and in then fixedly securing the latter body portion in said spread position.

7. A method which comprises acting on flexible sheet material to produce spaced lines of incision therein, securing the body portion of said incised sheet to a support, exerting pressure on said sheet on one side of said incision while secured to said support to expand the sheet and produce apertures on said lines of incision, and thereafter permanently securing the sheet in expanded position.

ALFRED O. MICKELSON.